United States Patent
Niv et al.

(10) Patent No.: US 12,237,979 B2
(45) Date of Patent: *Feb. 25, 2025

(54) MULTI-BASELINE UNSUPERVISED SECURITY-INCIDENT AND NETWORK BEHAVIORAL ANOMALY DETECTION IN CLOUD-BASED COMPUTE ENVIRONMENTS

(71) Applicant: Rapid7 Israel Technologies Ltd., Tel Aviv (IL)

(72) Inventors: Nitzan Niv, Nesher (IL); Gad Naor, Tel-Aviv (IL)

(73) Assignee: Rapid7 Israel Technologies Ltd., Tel Aviv (IL)

( * ) Notice: Subject to any disclaimer, the term of this patent is extended or adjusted under 35 U.S.C. 154(b) by 0 days.

This patent is subject to a terminal disclaimer.

(21) Appl. No.: 18/629,589

(22) Filed: Apr. 8, 2024

(65) Prior Publication Data
US 2024/0259271 A1    Aug. 1, 2024

Related U.S. Application Data (63) Continuation of application No. 18/446,402, filed on Aug. 8, 2023, now Pat. No. 11,985,040, which is a
(Continued)

(51) Int. Cl.
*H04L 41/142* (2022.01)
*G06F 9/54* (2006.01)
(Continued)

(52) U.S. Cl.
CPC ............ *H04L 41/142* (2013.01); *G06F 9/546* (2013.01); *G06N 5/01* (2023.01); *G06N 20/00* (2019.01);
(Continued)

(58) Field of Classification Search
CPC . H04L 67/535; H04L 63/1441; H04L 41/147; H04L 63/1425; H04L 63/1416;
(Continued)

(56) References Cited

U.S. PATENT DOCUMENTS 9,516,053 B1    12/2016   Muddu et al.
11,425,149 B2    8/2022   Niv et al.
(Continued)

OTHER PUBLICATIONS

Rienstra, Ranked Programming. Ranking Theory. Aug. 2018. 7 pages.
(Continued)

*Primary Examiner* — Kyung H Shin
(74) *Attorney, Agent, or Firm* — Wolf, Greenfield & Sacks, P.C.

(57) ABSTRACT

A method and system for detecting anomalous network activity in a cloud-based compute environment. The method comprises receiving configuration data and network activity observations for a set of virtual entities in the cloud-based compute environment; creating a profile for each virtual entity in the set of virtual entities, when the virtual entity does not already have an associated profile; dynamically updating the virtual entity of a profile with the respective network activity observations of the virtual entity; and determining whether anomalies have been detected.

17 Claims, 3 Drawing Sheets

Related U.S. Application Data continuation of application No. 17/590,221, filed on Feb. 1, 2022, now Pat. No. 11,818,014, which is a continuation of application No. 16/263,322, filed on Jan. 31, 2019, now Pat. No. 11,425,149.

(51) Int. Cl.
| | | |
|---|---|---|
| *G06N 5/01* | (2023.01) | |
| *G06N 20/00* | (2019.01) | |
| *G06Q 30/0251* | (2023.01) | |
| *H04L 9/40* | (2022.01) | |
| *H04L 41/069* | (2022.01) | |
| *H04L 41/14* | (2022.01) | |
| *H04L 43/062* | (2022.01) | |
| *H04L 67/30* | (2022.01) | |
| *H04L 67/50* | (2022.01) | |
| *H04W 12/06* | (2021.01) | |

(52) U.S. Cl.
CPC ....... *G06Q 30/0271* (2013.01); *H04L 41/069* (2013.01); *H04L 41/145* (2013.01); *H04L 43/062* (2013.01); *H04L 63/102* (2013.01); *H04L 63/104* (2013.01); *H04L 63/1416* (2013.01); *H04L 63/1425* (2013.01); *H04L 63/1441* (2013.01); *H04L 67/30* (2013.01); *H04L 67/535* (2022.05); *H04W 12/06* (2013.01)

(58) Field of Classification Search
CPC ... H04L 41/142; H04L 41/069; H04L 9/0872; H04L 43/0876; H04L 9/3236; H04L 43/04; H04L 63/14; H04L 43/0817; G06Q 30/0271; G06Q 30/0242; A61B 5/6801; H04W 4/029; H04W 12/06; H04W 12/12; G06F 16/288; G06F 16/285; G06F 21/552; G06F 9/00; G06F 11/3006; G06F 11/3089; G06F 16/9024; H04B 7/18593; G06N 5/01; G06N 20/00; G06N 7/02; G06N 5/022; G06N 5/02
See application file for complete search history.

(56) References Cited

U.S. PATENT DOCUMENTS

| | | |
|---|---|---|
| 11,818,014 B2 | 11/2023 | Niv et al. |
| 2013/0305357 A1* | 11/2013 | Ayyagari ............ H04L 41/069 726/22 |
| 2016/0078365 A1* | 3/2016 | Baumard ............ H04L 63/1425 706/12 |
| 2017/0262325 A1 | 9/2017 | Liisberg |
| 2018/0047065 A1* | 2/2018 | Wildberger ........... H04L 67/535 |
| 2019/0132344 A1 | 5/2019 | Lem et al. |
| 2020/0057956 A1* | 2/2020 | Phan ....................... G06N 5/01 |
| 2020/0195670 A1* | 6/2020 | Deardorff ........... H04L 63/1441 |
| 2020/0252416 A1 | 8/2020 | Niv et al. |
| 2022/0159025 A1 | 5/2022 | Niv et al. |
| 2023/0388195 A1 | 11/2023 | Niv et al. |

OTHER PUBLICATIONS

Scarfone et al., Guide to intrusion detection and prevention systems (idps). NIST special publication. Feb. 20, 2007;800(2007):94:1-127.

Spohn et.al., A Survey of Ranking Theory. KOPS—Konstanzer Online Publications, 2009:185-228.

* cited by examiner

MULTI-BASELINE UNSUPERVISED SECURITY-INCIDENT AND NETWORK BEHAVIORAL ANOMALY DETECTION IN CLOUD-BASED COMPUTE ENVIRONMENTS

CROSS-REFERENCE TO RELATED APPLICATIONS

This Application is a continuation of and claims priority under 35 U.S.C. § 120 to U.S. patent application Ser. No. 18/446,402, filed Aug. 8, 2023, titled "MULTI-BASELINE UNSUPERVISED SECURITY-INCIDENT AND NETWORK BEHAVIORAL ANOMALY DETECTION IN CLOUD-BASED COMPUTE ENVIRONMENTS", which is a continuation of and claims priority under 35 U.S.C. § 120 to U.S. patent application Ser. No. 17/590,221, filed Feb. 1, 2022, titled "MULTI-BASELINE UNSUPERVISED SECURITY-INCIDENT AND NETWORK BEHAVIORAL ANOMALY DETECTION IN CLOUD-BASED COMPUTE ENVIRONMENTS", which is a continuation of and claims priority under 35 U.S.C. § 120 to U.S. patent application Ser. No. 16/263,322, filed Jan. 31, 2019, which is hereby incorporated by reference in its entirety.

TECHNICAL FIELD

The present disclosure relates generally to cybersecurity, and more specifically to behavioral anomaly detection in cloud environments.

BACKGROUND

Modern enterprise's cloud operations often include many workloads running different services. Some services are under the jurisdiction and purview of development operations (DevOps), while others are owned by development alone. Services may be added, scaled up, scaled down, upgraded or removed at a fast pace. In such a complex and ever-changing environment, well-structured tier-based monitoring and management are essential. Properly handled, the different moving parts have well-defined, intent-based communications patterns that reveal a great deal about how they ought to be approached from a security perspective.

While policies-enforcing security features like micro-segmentation and cloud-provider security groups limit the allowed network connections between potentially interacting applications' workloads, these security features cannot stop the abuse of the permitted connections by external attackers, internally deployed malware or malicious insiders. For example, a web server should be allowed to connect to the database used by the web application that the web server is exposing to the world, but if there is a vulnerability in this application, an attacker may exploit the vulnerability to gain access through it to the data in the database.

Modern attacks are often complex and comprised of multiple steps, where each step prepares the ground for the next step. Each step may begin with a search for information about a system's status, location or workload, and then continue with opportunistically exploiting a vulnerability in the discovered system parts to escalate or extend the system's compromise to its more sensitive data and resources.

Some traditional security protection methods may not be able to dynamically, rapidly and automatically adapt to changing attack vectors and changing potential attack targets. It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" may be used herein to refer to a single embodiment or multiple embodiments of the disclosure.

Some embodiments disclosed here include a method for detecting anomalous network activity. The method includes receiving configuration data and network activity observations for a set of virtual entities; creating a profile for each virtual entity in the set of virtual entities, when the virtual entity does not already have an associated profile; dynamically updating the virtual entity's profile with the virtual entity's network activity observations; and determining whether anomalies have been detected.

Some embodiments disclosed here include a system for system for detecting anomalous network activity in a based compute environment. The system comprises a processing circuitry; and a memory, the memory containing instructions that, when executed by the processing circuitry, configure the system to: receive configuration data and network activity observations for a set of virtual entities in the cloud-based compute environment; create a profile for each virtual entity in the set of virtual entities, when the virtual entity does not already have an associated profile; dynamically update the virtual entity of a profile with the respective network activity observations of the virtual entity; and determine whether anomalies have been detected.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

Some example embodiments, disclosed herein, include a method and system for network behavioral anomaly detection. One or more virtual workloads may be considered monitored entities. The security system may use probabilistic unsupervised learning methods such as forward propagation, feedback and backward propagation to identify expected network behavior of monitored entities and deviations from these expected profiles. The security system may process this information using one or more machine learning techniques directed by security expertise, which highlights unexpected network usage patterns and unusual data transfers initiated by workloads.

In some embodiments, a security system may create one or more models of the network activity of monitored entities, that may be used to represent their expected network behavior profile and to compare against observed behavior for detection of deviations. The model includes information from configurations relationships between entities, like memberships in entities groups, entities functional dependencies and deployment constraints as expressed in deployment configurations and co-deployment of entities on nodes. Furthermore, modeled relationships between entities include possible, allowed and used network paths between those entities, and the protocols and attributes of the content of the observed traffic between them. This learned model may be continuously updated using such factors as history of and change in network activity attributes, as well as deployment and orchestration configuration changes. In some embodiments, these models of entities and the sets of relationships between them may be represented as a graph.

In some embodiments, the system may categorize monitored entities into one or more groups. Such entities-groups include, for example: a group of entities which are executing the same application component (for example, multiple instances of the same partitioned database) or a group of entities that have the same applicative functionality (for example, all the databases of an application) or the group of entities that are all parts of the same application. A security system may create one or more models of the aggregated network activity of such entities-groups, that may be used to represent their expected network behavior profile and to compare against the observed behavior of the entities-group for detection of deviations. The system may also identify deviations between an entity's profile and the profiles of one or more of the entity-groups this entity is a member of. The system may update the learned model of an entities-group continuously according to monitored activity of the one or more of the group's member entities, using such factors as history of and change in network activity attributes, as well as deployment and orchestration configuration changes. In some embodiments, these models of entities-groups and the set of relationships between them may be represented as a graph.

In some embodiments, the system may categorize network connections between specific monitored entities into one or more connections-groups. Such connections grouping may be based, for example, on having similar activity attributes, being connections to or from a specific entity type like a database, being incoming connections from clients on the internet to the monitored application entities or being connections outgoing from monitored entities of an application to an external third-party service. A security system may create one or more models of the aggregated network activity observed on such connections-groups, that may be used to represent their expected network behavior profile and to compare against observed behavior for detection of deviations. The system may update the learned model of such connections-group continuously according to monitored activity on one or more of the group's member connections, using such factors as history and change in network activity attributes, as well as deployment and orchestration configuration changes. In some embodiments, these models of connections-groups and the set of relationships between them may be represented as a graph.

In some embodiments, deviations between the observed network activity of an entity and its expected network behavior profile, or deviations between the observed network activity of an entities-group and its expected network behavior profile, or deviations between the observed network activity of an entity and the expected network behavior profile of one or more of the entity-groups it belongs to, or deviations between the observed network activity on a network connection and the expected network behavior of one or more of the connections-groups it belongs to, may be considered a detection of anomalous network behavior and a possible indicator of a security incident.

In some embodiments, combinations of one or more of these detected abnormal behaviors of entities, entities-groups or connections-groups may be considered a detection of a security incident. Such potential combinations of anomalies detected at the entity, entities-group and connections-group levels in some embodiments provide detection of attacks that are either overlooked or undetected by traditional protection layers, including abnormal behaviors and security incidents such as DNS tunneling, spoofing attacks, caches poisoning, lateral movement of malware between system components, incoming connections from known malicious sources, reconnaissance of services deployed inside the data center from internal or external endpoints, unexpected changes in characteristics of data transfers between internal databases and internal, possibly compromised, processing workloads, and attempts by potentially infected services to connect to remote command and control servers or to exfiltrate sensitive information from the data center.

Some embodiments may report, log or inform users or monitoring systems about detected anomalies and incidents. Some embodiments may also offer protection against attacks that are detected by the attack detection engine. Such attack mitigations may be automatically applied according to the specific detected anomalies and incidents and the entities and connections on which they were detected.

Figure 1:
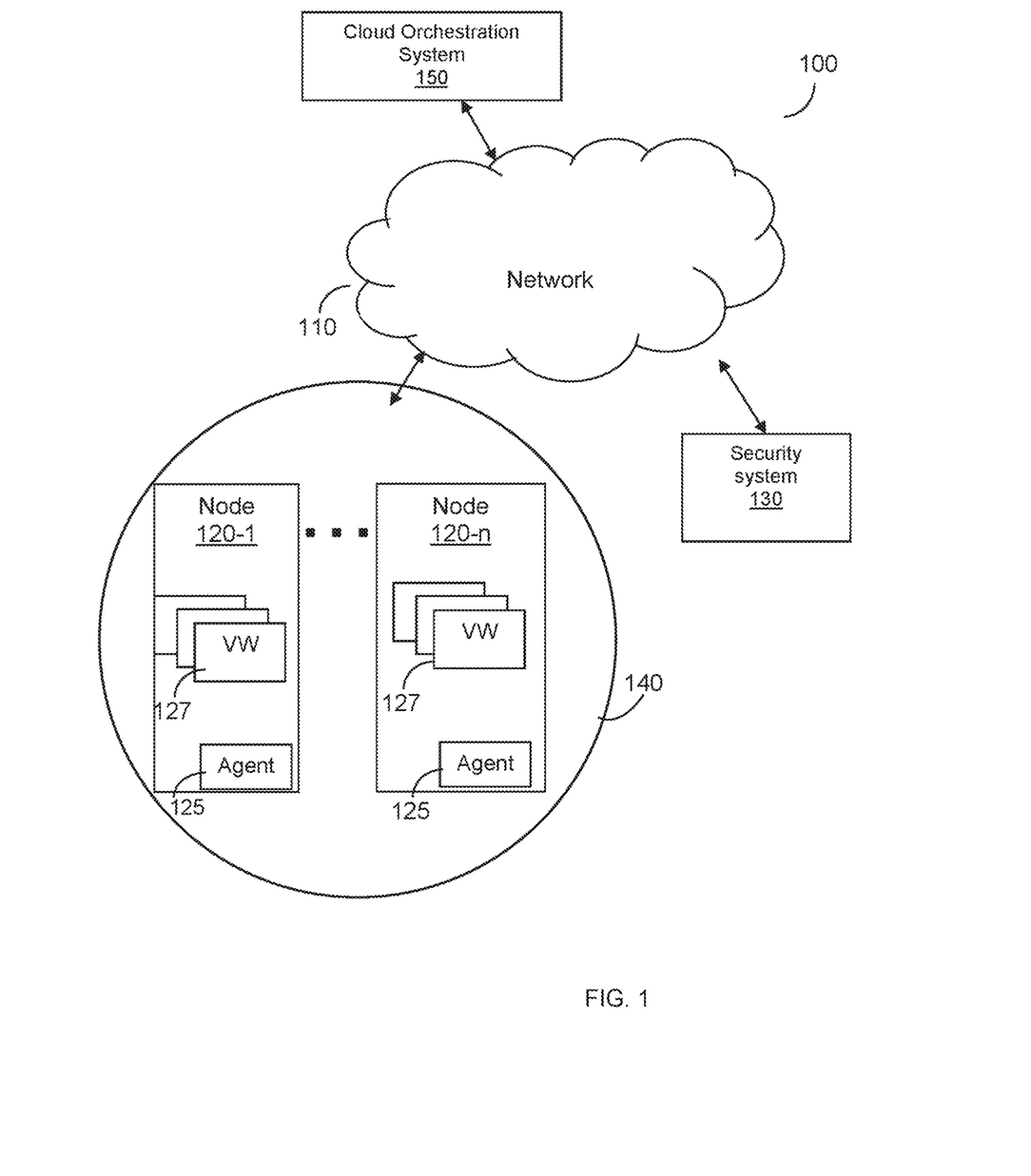
FIG. 1 illustrates an exemplary network diagram according to various disclosed embodiments.

FIG. 1 illustrates an example network diagram 100 utilized to describe the various disclosed embodiments. In the example network diagram 100, nodes 120-1 through 120-n (collectively referred to hereinafter as nodes 120 or individually as a node 120), and a security system 130, are communicatively connected via a local area network (LAN).

A node 120 may include, but is not limited to, a server or a hosting environment capable of executing one or more virtual workloads. In some embodiments, each node 120 may be a physical machine residing on a cloud computing platform 140.

The cloud computing platform 140 may include, but is not limited to, a public cloud, a private cloud, or a hybrid cloud Examples for public cloud computing platforms may include Amazon Web Services™, Microsoft Azure™, and Google Cloud Platform™, and the like.

Each node 120 may be configured with an agent 125. The agent 125 collects runtime information on virtual entities workloads 127 executed within each node 120. This information may include configuration specification. This information includes the incoming and outgoing network activity of the workloads that are executing on the node and may also include the incoming and outgoing network activity of the node itself. The information may include additional local runtime and operating-system information related to the workload executing on the node, like memory, CPU, and disk usage, and system calls, caches hits and caches misses statistics. In case of an embodiment combining attacks detection with attacks mediation, the agent 125 may also be used according to the detection by security system 130 to limit, prevent, drop, report or modify the network activity of one or more of the workloads on the node or the activity of the node itself.

In an embodiment, monitored entities are virtual workloads, such as virtual machines (VM's), containers, microservices, serverless functions, pods and the like, or combination of some or all of these. In an embodiment, the virtual entities 127 are grouped to execute a single protected object. A monitored entity may be a web application, a cloud application, a micro-service and the like. It should be noted that a group of virtual entities 127 may include entities 127 executed over different nodes 120. That is, a group (hence, a protected object) may contain virtual entities 127 distributed across nodes 120 in the cloud platform 140. In an embodiment, the configuration of which virtual entities belong to which group is provided by a cloud orchestration system 150 or is part of the configuration available on nodes 120 of the entities 127 executing on them. It should be noted that groups are dynamically created and updated.

According to the disclosed embodiments, the security system 130 includes a component for network behavioral anomaly detection. The security system 130 also includes a component for extracting or receiving network activity information about each monitored entity from the respective agent 125 on its node 120, a component for extracting or receiving workloads deployment and configuration information from the orchestration system 150 or the entities' agents 125 or both. The security system 130 receives those inputs over the network 110. For example, the security system 130 may receive network activity features, deployment information, entities-groups features (such as network activity, deployment information, etc.), periodic features and/or changes relative to history for one or more profiles from nodes 120.

The security system 130 may communicate with the cloud orchestration system 150 to gather, receive, merge, filter and store cloud configuration information. For example, orchestration system 150 may indicate to security system 130 how many virtual machines are created, how many resources are needed, how many virtual resources are being taken down etc. The cloud orchestration system 150 may automate configuration, coordination, and management of virtual workloads executed on each node 120.

In some embodiments, security system 130 is configured to use probabilistic behavior learning to account for network anomalies. For example, security system 130 may use forward propagation and observations, as well as feedback and backward propagation, as part of the anomaly and incident detection.

Security system 130 uses unsupervised machine learning algorithms as described below for creating and continuously updating profiles of recent behavior of virtual workloads, workload-groups, connections-groups and nodes executed on a protected node.

In order to learn the profile of such an entity, security system 130 may receive data about the entity, its deployment characteristics and its network activity. Security system 130 may also extend the entity's profile with processed information about other entities that are related to the monitored entity, for example from deployment configurations describing multiple instances of the same base process, or network activity of other entities that are connected to the profiled entity. The profile models how the entity is likely to behave in the future based on the collected data.

The security system 130 may send one or more outputs to the nodes 120. For example, the security system 130 may send various data collection commands, detections indicators and mitigations commands to the agents 125 on the nodes 120 where incidents were detected.

In an embodiment, security system 130 may present one or more user interfaces. The user interfaces may present to a user abnormal network behavior (anomalies and incidents) detected by the security system 130, such as dashboards, reports, charts, tables, or other textual or graphical summaries. In some embodiments, the detected anomalies and incidents may be queried on behalf of the user through textual, graphical or application interfaces. In some embodiments, the identified anomalies and incidents may be passed to other systems for monitoring, notification or presentation.

It should be noted that the example implementation shown in FIG. 1 is described with respect to the nodes in a single cloud computing platform 110 merely for simplicity purposes and without limitation on the disclosed embodiments. More or fewer cloud computing platforms, data centers, or both, may be protected without departing from the scope of the disclosure.

Figure 2:
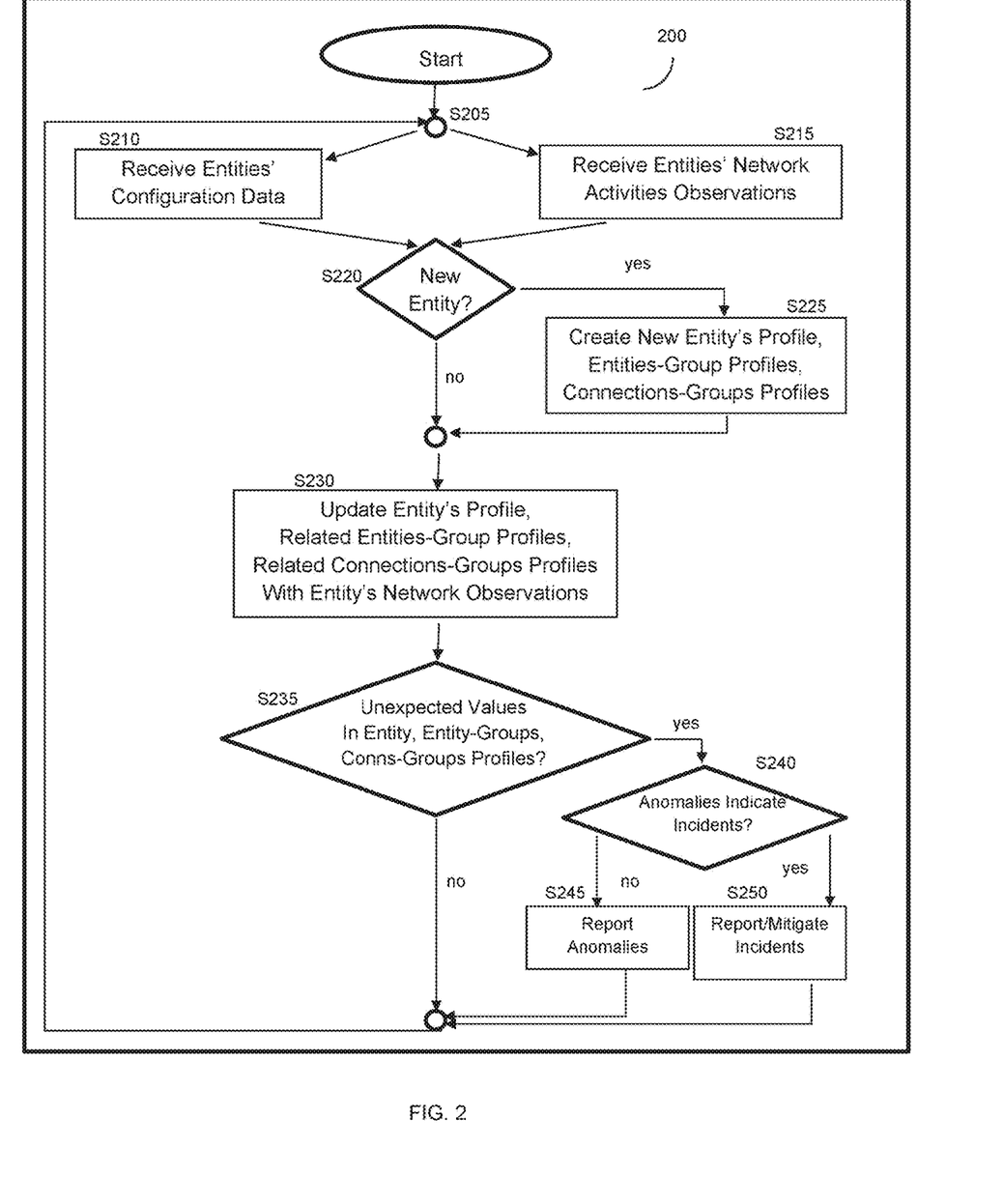
FIG. 2 illustrates a method of network behavior anomaly detection, according to some embodiments.

FIG. 2 illustrates an example flowchart 200 of a method for network behavior anomaly detection according to an embodiment. At S205, the system is ready to receive entities' configuration data and at S215 to receive entities' network activities observations.

At S210, configuration data is received from a cloud orchestration system and/or the system's agents. The configuration data indicates at least which virtual workloads are executing instantiations of a protected entity and on which nodes Configuration data may also include additional information like scheduling constraints, network identifiers, network endpoints, software version, metadata tags and user annotations. An embodiment may learn from such configuration indicators that sets of virtual entities are designed to be executed together or have functional, scheduling, deployment or management dependencies on each other, for example, load sharing through adaptive scaling of multiple workload instances and load balancing between them, or high availability of a workload through redundancy of its workload instances, or functional decomposition of an application to interacting workloads. Using these configuration indicators, an embodiment may categorize entities into entities-groups that are expected to have similar network behavior. Using these configuration indicators, an embodiment may also categorize specific connections between entities to connections-groups that are expected to have similar network behavior. As configuration data is continuously updated from the cloud orchestration system and agents, these categorizations of entities and connections may be dynamically adapted to the recent state of the monitored system.

At S220, the system receives entities' network activities observations. These include for example, counters of outgoing and incoming traffic bytes, packets and connections, the number of unique endpoints that the entity interacted with over a time period, and the protocols and ports used in the entity's traffic.

At S225, a profile is created for each monitored entity (virtual workload), if the entity does not already have associated profiles in the detection component (S220). If the entity is identified as a member of entities-groups, or its connections are identified as members of connections-groups, profiles are also created for those groups if necessary.

In some embodiments, the profile of an entity may include one or more probabilistic distributions over the values of a large set of factors. Each factor may represent an aspect of the behavior of the virtual entity. Some of these factors are directly observable and can be measured. For example, the number of bytes sent over an outgoing connection of the entity during a specific time period. Other factors are not observable, and represent an assumed aspect of the internal state of the entity that affects the observed behavior. The values of the unobservable factors may be learned from their probabilistic dependencies (like conditional probability) on observable factors. The aggregated learned distribution of values of all the factors represents a modeled baseline of the entity's observed behavior or internal state.

In some embodiments, the profile of a monitored entity may describe conditional relationships between the factors that represent its assumed state. The probabilistic distribution of values of a factor may depend on one or more other factors through mathematical relationships. Some factors directly represent observed features of the monitored entity, so they may not depend on any other factors. The entire set of factors with the relationships between them may be formed into a data structure such as a linked list, binary tree, or directed acyclic graph.

Entities-groups profiles like those created in S225, represent, for example, an aggregated profile for a group of virtual entities that are all part of a protected object. When the protected object has multiple deployed instances of the virtual entities, it is assumed that such instances have similar underlying runtime behavior, even though they will not behave identically due to external influences like work distribution, resource allocations and timing differences.

At S230, the new observations of the actual network-related behavior of monitored entities are used to periodically update the profile of the monitored entity. Thus, the profile is automatically adapted to the dynamic changes in the entities' network behaviors. The values distribution of each observed factor is updated by merging into it its newly measured values with the measurement's uncertainty. The update of a specific factor's values distribution takes into account the factor's previous values distribution, the similarity or dissimilarity of the new values to the old values, the uncertainty about these new values, and the likelihood that the new value affects the existing values.

The updated values distributions are then recursively propagated according to the model's probabilistic dependencies between factors and the modeled mathematical relationships between their values. This propagation of new observed values ends when the effect of the new observations is accounted for by all the model's factors.

At S235, the updated profiles are checked to see if they include significant deviations from the previous profile. For example, values or changes in values exceeding thresholds of normal entity behavior or new values that are extremely unlikely according to their previous probability distribution are considered anomalous. The significance of the deviations takes into account both the difference between the expected and actual numeric values of a factor, and the uncertainty in the expected values and the uncertainty in the measurement of the actual observation.

At S240, a check is made to determine if the combination of detected anomalies may all be attributed to one or more incidents. In some embodiments this attribution is based on familiarity with known attacks which are expected to manifest in a set of anomalies. For example, a specific malicious behavior may be identified, such as a network scanner. If so, execution continues with S250 where a report is generated providing an information on the detected anomalies and the type of detected incidents. S250 may also include initiation of a mitigation action. Otherwise, in S245, the detected anomalies are reported.

Execution then returns to S205 to receive and process the next measurements of entities network activities and entities configurations changes.

Figure 3:
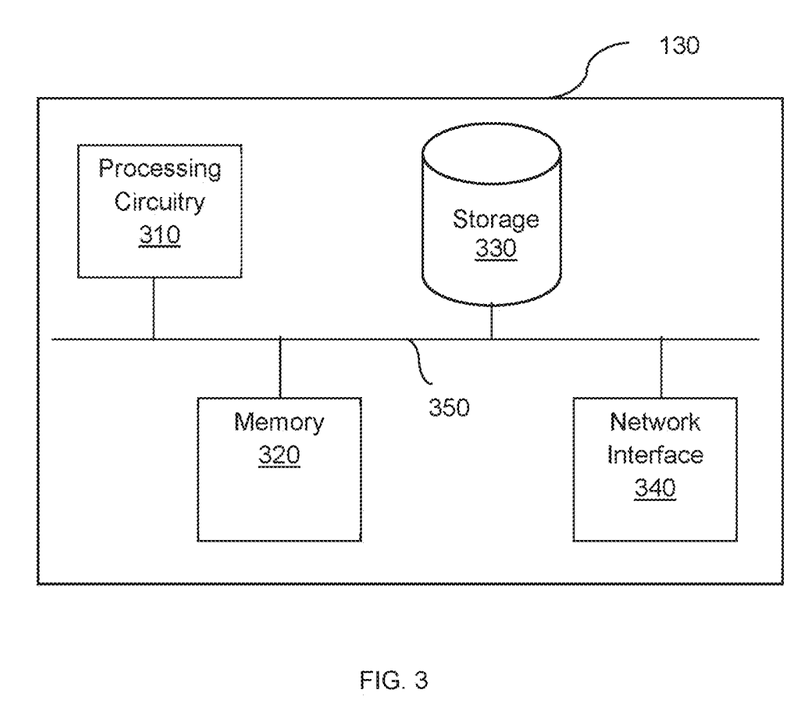
FIG. 3 is an exemplary schematic diagram of a security system according to some embodiments.

FIG. 3 illustrates an exemplary schematic diagram of a security system 130 according to some embodiments. The security system 130 includes a processing circuitry 310 coupled to a memory 320, a storage 330, and a network interface 340. In an embodiment, the components of the security system 130 may be communicatively connected via a bus 350.

The processing circuitry 310 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 320 may be volatile (e.g., RAM, etc.), non-volatile (e.g., ROM, flash memory, etc.), or a combination thereof. In one configuration, computer readable instructions to implement one or more embodiments disclosed herein may be stored in the storage 330.

In another embodiment, the memory 320 is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 310, cause the processing circuitry 310 to perform the various processes described herein. Specifically, the instructions, when executed, cause the processing circuitry 310 to generate fleet behavior models and detect anomalous behavior in fleets or sub-fleets as described herein.

The storage 330 may be magnetic storage, optical storage, and the like, and may be realized, for example, as flash memory or other memory technology, CD-ROM, Digital Versatile Disks (DVDs), or any other medium which can be used to store the desired information. The network interface 340 allows the security system 130 to communicate with the node 120 for the purpose of, for example, receiving data, sending data, and the like.

It should be understood that the embodiments described herein are not limited to the specific architecture illustrated in FIG. 3, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

The invention claimed is:

1. A system for detecting anomalous network behavior in a cloud-based computing environment by using profiles indicating expected network behavior associated with virtual entities, the system comprising:
at least one computer hardware processor configured to perform:
receiving network activity observations for a monitored virtual entity hosted in the cloud-based computing environment, the monitored virtual entity being associated with a corresponding entity profile indicating expected network behavior associated with the virtual entity;
detecting anomalous network behavior by the monitored virtual entity by identifying deviations between the received network activity observations for the monitored virtual entity and the entity profile;
determining that the anomalous network behavior indicates a security incident; and
generating a report indicating the security incident and the anomalous network behavior.

2. The system of claim 1, wherein the monitored virtual entity is a virtual machine hosted on a physical host of the cloud-based computing environment.

3. The system of claim 1, further comprising:
updating the entity profile for the monitored virtual entity using the network activity observations to obtain an updated entity profile for the monitored virtual entity.

4. The system of claim 3, wherein detecting the anomalous network behavior by the monitored virtual entity comprises comparing the updated entity profile for the monitored virtual entity with the entity profile.

5. The system of claim 3,
wherein the entity profile includes one or more probabilistic distributions over a corresponding one or more factors, each of the one or more factors representing an aspect of behavior of the monitored virtual entity,
wherein updating the entity profile for the monitored virtual entity comprises updating the one or more probabilistic distributions based on the network activity observations.

6. The system of claim 5, wherein the one or more factors includes multiple factors and the entity profile describes conditional relationships among the multiple factors.

7. The system of claim 6, wherein the entity profile represents the conditional relationships among the multiple factors using a directed acyclic graph.

8. The system of claim 1, further comprising initiating one or more mitigation actions to mitigate the anomalous network behavior.

9. At least one non-transitory computer readable storage medium storing processor executable instructions that, when executed by at least one computer hardware processor, cause the at least one computer hardware processor to perform a method for detecting anomalous network behavior in a cloud-based computing environment by using profiles indicating expected network behavior associated with virtual entities, the method comprising:
receiving network activity observations for a monitored virtual entity hosted in the cloud-based computing environment, the monitored virtual entity being associated with a corresponding entity profile indicating expected network behavior associated with the virtual entity;
detecting anomalous network behavior by the monitored virtual entity by identifying deviations between the received network activity observations for the monitored virtual entity and the entity profile;
determining that the anomalous network behavior indicates a security incident; and
generating a report indicating the security incident and the anomalous network behavior.

10. The at least one non-transitory computer readable storage medium of claim 9, wherein the monitored virtual entity is a virtual machine hosted on a physical host of the cloud- based computing environment.

11. The at least one non-transitory computer readable storage medium of claim 9, further comprising:
updating the entity profile for the monitored virtual entity using the network activity observations to obtain an updated entity profile for the monitored virtual entity.

12. The at least one non-transitory computer readable storage medium of claim 11, wherein detecting the anomalous network behavior by the monitored virtual entity comprises comparing the updated entity profile for the monitored virtual entity with the entity profile.

13. The at least one non-transitory computer readable storage medium of claim 12, wherein the one or more factors includes multiple factors and the entity profile describes conditional relationships among the multiple factors.

14. The at least one non-transitory computer readable storage medium of claim 13, wherein the entity profile represents the conditional relationships among the multiple factors using a directed acyclic graph.

15. The at least one non-transitory computer readable storage medium of claim 11,
wherein the entity profile includes one or more probabilistic distributions over a corresponding one or more factors, each of the one or more factors representing an aspect of behavior of the monitored virtual entity,
wherein updating the entity profile for the monitored virtual entity comprises updating the one or more probabilistic distributions based on the network activity observations.

16. The at least one non-transitory computer readable storage medium of claim 9, further comprising initiating one or more mitigation actions to mitigate the anomalous network behavior.

17. A system for detecting anomalous network behavior in a cloud-based computing environment by using profiles indicating expected network behavior associated with virtual entities, the system comprising:
at least one computer hardware processor configured to perform:
receiving network activity observations for a monitored virtual entity hosted in the cloud-based computing environment, the monitored virtual entity being associated with a corresponding entity profile indicating expected network behavior associated with the virtual entity;
detecting anomalous network behavior by the monitored virtual entity by identifying deviations between the received network activity observations for the monitored virtual entity and the entity profile; and
generating a report indicating the anomalous network behavior.

* * * * *